US011096101B2

(12) United States Patent
Agiwal et al.

(10) Patent No.: US 11,096,101 B2
(45) Date of Patent: Aug. 17, 2021

(54) METHOD OF UL ACCESS IN A CELL SUPPORTING SUPPLEMENTARY UPLINK

(71) Applicant: Samsung Electronics Co., Ltd., Suwon-si (KR)

(72) Inventors: Anil Agiwal, Suwon-si (KR); Mangesh Abhimanyu Ingale, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/817,401

(22) Filed: Mar. 12, 2020

(65) Prior Publication Data
US 2020/0296639 A1    Sep. 17, 2020

(30) Foreign Application Priority Data

Mar. 12, 2019   (IN) .............................. 201931009593

(51) Int. Cl.
*H04W 36/00* (2009.01)
*H04B 17/318* (2015.01)
*H04W 74/08* (2009.01)

(52) U.S. Cl.
CPC ...... *H04W 36/0085* (2018.08); *H04B 17/318* (2015.01); *H04W 74/0833* (2013.01)

(58) Field of Classification Search
None
See application file for complete search history.

(56) References Cited

U.S. PATENT DOCUMENTS

| | | | |
|---|---|---|---|
| 10,212,633 B1 | 2/2019 | Govindassamy et al. | |
| 2018/0176846 A1 | 6/2018 | Sundberg et al. | |
| 2018/0316481 A1* | 11/2018 | Montojo | H04L 5/14 |
| 2019/0150052 A1* | 5/2019 | Wang | H04W 88/023 |
| | | | 370/331 |
| 2019/0166529 A1* | 5/2019 | Chen | H04L 5/0096 |
| 2019/0222367 A1* | 7/2019 | Tseng | H04L 5/001 |
| 2019/0237069 A1* | 8/2019 | Zhao | G06F 40/55 |
| 2019/0327069 A1* | 10/2019 | Novlan | H04L 5/0039 |
| 2019/0394825 A1* | 12/2019 | Byun | H04W 76/11 |
| 2020/0053799 A1* | 2/2020 | Jeon | H04W 16/14 |
| 2020/0084806 A1* | 3/2020 | Orsino | H04W 72/085 |
| 2020/0100116 A1* | 3/2020 | Chakraborty | H04W 24/04 |
| 2020/0221372 A1* | 7/2020 | Shih | H04W 72/0453 |
| 2021/0099906 A1* | 4/2021 | Nam | H04W 80/08 |

OTHER PUBLICATIONS

3GPP TS 38.304 V15.2.0, Dec. 2018, hereinafter known as 3GPP (Year: 2018).*

* cited by examiner

*Primary Examiner* — Jamaal Henson

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method by a terminal in a mobile communication system is provided. The method includes determining reference signal received power (RSRP) of a signal; identifying whether the RSRP is less than a predetermined threshold; identifying whether the terminal satisfies at least one of predetermined conditions, in case that the RSRP is less than the predetermined threshold; and determining to bar a first carrier of a serving cell and trigger cell reselection to a second carrier, based on a result of the identification.

20 Claims, 6 Drawing Sheets

METHOD OF UL ACCESS IN A CELL SUPPORTING SUPPLEMENTARY UPLINK

CROSS-REFERENCE TO RELATED APPLICATION

This application is based on and claims priority under 35 U.S.C. § 119 to Indian Provisional Patent Application No. 201931009593 filed on Mar. 12, 2019, the disclosure of which is herein incorporated by reference in its entirety.

BACKGROUND

1. Field

The disclosure relates to method and apparatus of uplink (UL) access in a cell supporting supplementary uplink (SUL) in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Typically in an RRC IDLE/INACTIVE state, if a cell supports both a SUL and a UL carrier, the UE selects between the SUL and the UL carrier when the random access procedure is initiated. Depending on UE capability, it is possible that the UE may not support the SUL or it may not support the SUL configuration (e.g., frequency band or bandwidth or spectrum emissions for the SUL) of a camped cell. In this scenario, when a random access procedure is initiated, the UE selects the UL carrier regardless of which coverage region the UE is in. As a result the UE performs the random access procedure using the UL carrier and if the UE is in an area outside the coverage of a NUL carrier, it eventually fails. In the RRC IDLE/INACTIVE state, the random access procedure is typically initiated for connection establishment or for connection resume respectively, which will be unnecessarily delayed. So a method to enhance the current procedure is needed.

According to an aspect of the present disclosure, a method by a terminal in a mobile communication system is provided, the method includes determining reference signal received power (RSRP) of a signal; identifying, whether the RSRP is less than a predetermined threshold; identifying, whether the terminal satisfies at least one of predetermined conditions, in case that the RSRP is less than the predetermined threshold; and determining to bar a first carrier of a serving cell and trigger cell reselection to a second carrier, based on a result of the identification.

In accordance with another aspect of the present disclosure, a terminal in a mobile communication system is provided, the terminal includes a transceiver; and a processor coupled with the transceiver, the processor configured to: determine reference signal received power (RSRP) of a signal; identify whether the RSRP is less than a predetermined threshold; identify whether the terminal satisfies at least one of predetermined conditions, in case that the RSRP is less than the predetermined threshold; and determine to bar a first carrier of a serving cell and trigger cell reselection to a second carrier, based on a result of the identification.

According to embodiments of the disclosure, it is possible to remove unnecessary delay, when the UE performs random access in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
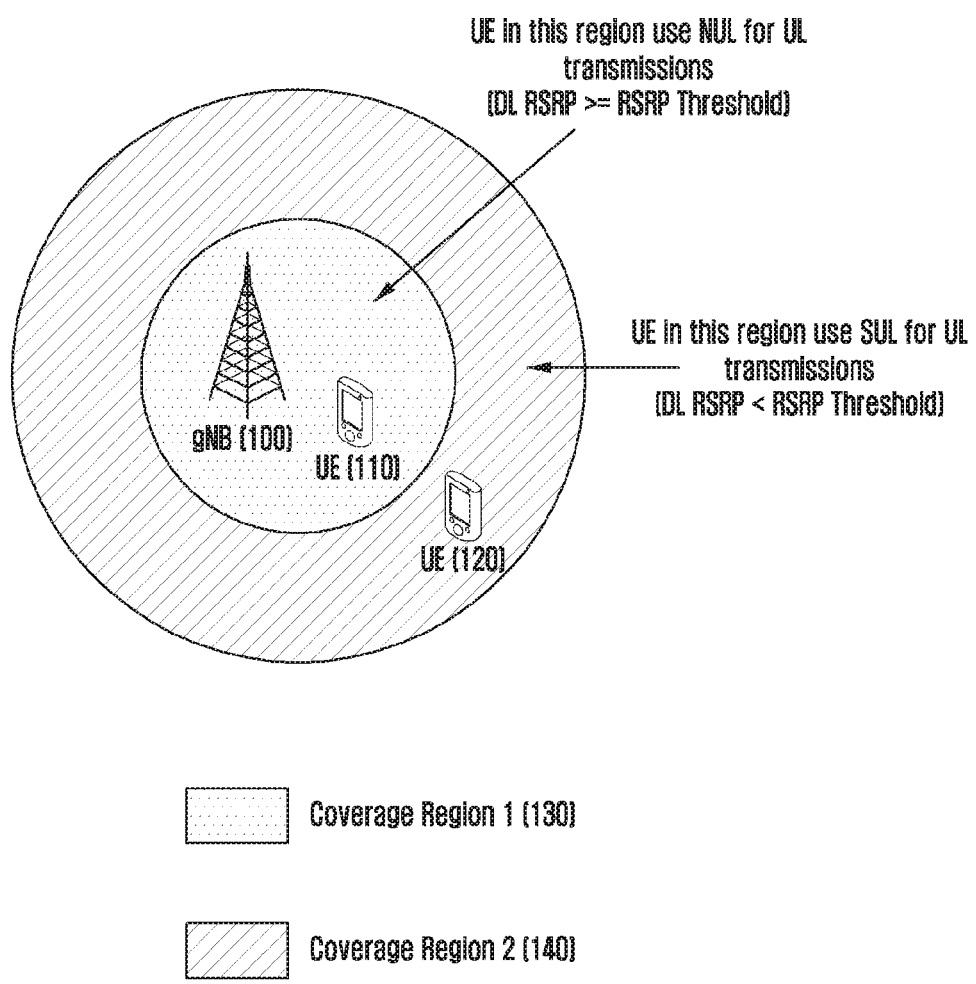
FIG. 1 illustrates a diagram explaining coverage of NUL carrier and coverage of SUL.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. The example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fifth generation wireless communication system (also referred as next generation radio or NR), cell (re-) selection is supported to camp on a cell in a radio resource control (RRC) IDLE and a RRC INACTIVE state. Cell selection is also supported when the UE encounters radio link failure in the RRC CONNECTED state. With cell selection, the UE searches for a suitable cell of the selected PLMN, chooses that cell to provide available services, and monitors its control channel. This procedure is defined as "camping on the cell". The UE shall, if necessary, then register its presence, by means of a NAS registration procedure, in the tracking area of the chosen cell. As an outcome of a successful Location Registration, the selected PLMN then becomes the registered PLMN.

A suitable cell is one for which the measured cell attributes satisfy the cell selection criteria (as defined in TS 38.304); the cell PLMN is the selected PLMN, registered or an equivalent PLMN; the cell is not barred or reserved and the cell is not part of a tracking area which is in the list of "forbidden tracking areas for roaming" If the UE finds a more suitable cell, according to the cell reselection criteria (as defined in TS 38.304), it reselects onto that cell and camps on it. If the new cell does not belong to at least one tracking area to which the UE is registered, location registration is performed. In the RRC_INACTIVE state, if the new cell does not belong to the configured RNA, an RNA update procedure is performed.

The purpose of camping on a cell in the RRC_IDLE state and the RRC_INACTIVE state is fourfold:

a. It enables the UE to receive system information from the PLMN.

b. When registered and if the UE wishes to establish an RRC connection or resume a suspended RRC connection, it can do this by initially accessing the network on the control channel of the cell on which it is camped.

c. If the network needs to send a message or deliver data to the registered UE, it knows (in most cases) the set of tracking areas (in the RRC_IDLE state) or RNA (in the RRC_INACTIVE state) in which the UE is camped. It can then send a "paging" message for the UE on the control channels of all the cells in the corresponding set of areas. The UE will then receive the paging message and can respond.

d. It enables the UE to receive ETWS and CMAS notifications.

A base station may be referred to as, in addition to a base station, an "Access Point (AP)", a "evolved Node B (eNB)", a "next generation Node B (gNB)", a "5th Generation (5G) node", a "wireless point", a "Transmission/Reception Point (TRP)", or other terms having equivalent technical meanings. A UE may access a radio access network, and may perform communication with the base station through a radio channel. The UE may be referred to as, in addition to a terminal, a "User Equipment (UE)", a "mobile station", a "subscriber station", a "remote terminal", a "wireless terminal", a "user device", or other terms having equivalent technical meanings.

Typically a cell (on which the UE camps) supports a downlink (DL) carrier and an uplink (UL) carrier. In NR, a cell may also support supplementary uplink (SUL) carrier in addition to uplink carrier. UL carrier is also referred as normal UL (NUL). A typical usage of SUL is to overcome limited UL coverage of high frequency bands (>6 GHz), also referred as FR2 frequency bands. The lower frequency bands (<=6 GHz) are also referred as FR1 frequency bands. A cell with DL and UL carrier in FR2 frequency band can be configured with SUL carrier in FR1 frequency band to overcome limited coverage of UL carrier.

As shown in FIG. 1, coverage of the NUL carrier is limited to coverage region 1 (130). Signals transmitted on the NUL carrier by a UE (120) outside the coverage region 1 (130) cannot be received by the gNB (100). In coverage region 2 (140), UL coverage can be provided by only the SUL carrier. Signals transmitted on the SUL carrier by a UE (120) in the coverage region 2 (140) can be received by the gNB (100). The UE (110, 120) decides to use the SUL or the NUL based on the DL signaling quality. If the DL determine reference signal received power (RSRP)>=RSRP threshold the UE (110) uses the UL carrier for UL transmissions. If DL RSRP<RSRP threshold the UE (120) uses the SUL carrier for UL transmissions. Typically in the RRC IDLE/INACTIVE state, if a cell supports both SUL and UL carrier, the UE (110, 120) selects between the SUL and the UL carrier when the random access procedure is initiated.

Depending on UE capability, it is possible that the UE (110, 120) may not support the SUL or it may not support the SUL configuration (e.g., frequency band or bandwidth or spectrum emissions for SUL) of the camped cell. In this scenario, when the random access procedure is initiated, the UE (110, 120) selects the UL carrier irrespective of whether the UE (110, 120) is in coverage region 1 (130) or coverage region 2 (140). As a result the UE (110, 120) performs the random access procedure using the UL carrier and if the UE (120) is in coverage region 2 (140), it eventually fails. In the RRC IDLE/INACTIVE state, the random access procedure is typically initiated for connection establishment or for connection resume respectively, which will be unnecessarily delayed.

So a method to enhance the current procedure is needed.

Typically a cell on which the UE camps supports a downlink (DL) carrier and an uplink (UL) carrier. In NR, a cell may also support a supplementary uplink (SUL) carrier in addition to the uplink carrier. The UL carrier is also referred as normal UL (NUL). A typical usage of the SUL is to overcome limited UL coverage of high frequency bands (>6 GHz), also referred as FR2 frequency bands. The lower frequency bands (<=6 GHz) are also referred as FR1 frequency bands. A cell with DL and UL carrier in FR2 frequency band can be configured with the SUL carrier in FR1 frequency band to overcome limited coverage of UL carrier.

As shown in FIG. 1, coverage of the NUL carrier is limited to coverage region 1 (130). Signals transmitted on the NUL carrier by a UE (120) outside the coverage region 1 (130) cannot be received by the gNB (100). In coverage region 2 (140), the UL coverage can be provided by only the SUL carrier. Signals transmitted on the SUL carrier by a UE (120) in the coverage region 2 (140) can be received by the gNB (100). The UE (110, 120) decides to use the SUL or the NUL based on the DL signaling quality. If DL RSRP>=RSRP threshold the UE (110) uses the UL carrier for UL transmissions. If DL RSRP<RSRP threshold the UE (120) uses the SUL carrier for UL transmissions. Typically in the RRC IDLE/INACTIVE state, if a cell supports both the SUL and the UL carrier, the UE (110, 120) selects between the SUL and the UL carrier when the random access procedure is initiated.

Depending on UE capability, it is possible that the UE (110, 120) may not support the SUL or it may not support the SUL configuration (e.g., frequency band or bandwidth or spectrum emissions for the SUL) of the camped cell. In this scenario, when the random access procedure is initiated, the UE (110, 120) selects UL carrier irrespective of whether UE (110, 120) is in coverage region 1 (130) or coverage region 2 (140). As a result the UE (110, 120) performs the random access procedure using the UL carrier and if the UE (120) is in coverage region 2 (140), it eventually fails. In the RRC IDLE/INACTIVE state, the random access procedure is typically initiated for connection establishment or for connection resume respectively, which will be unnecessarily delayed.

The various embodiments in this disclosure to overcome the above-mentioned problem are described below:

Embodiment 1

Figure 2:
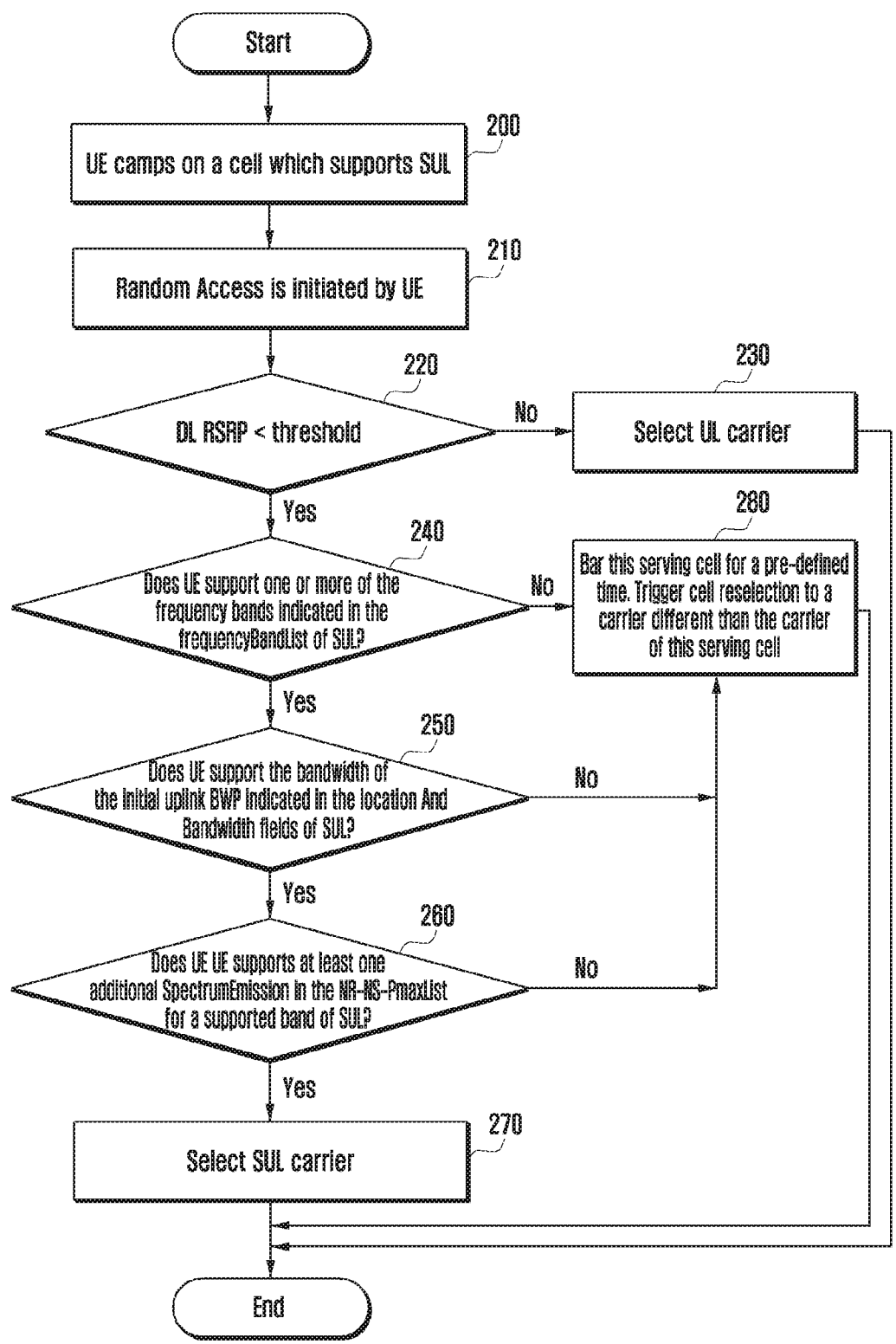
FIG. 2 illustrates an operational flowchart explaining a process of terminal proposed in embodiment 1.

In one embodiment of this disclosure the UE operation is illustrated in FIG. 2.

The UE camps on a suitable cell (200). The cell (on which the UE camps) supports a downlink (DL) carrier, an uplink (UL) carrier and a supplementary uplink (SUL) carrier. Note that presence of the SUL carrier in the cell is indicated by presence of supplementaryUplink IE in SIB1. The supplementaryUplink IE provides information (such as associated frequency band(s), additionalPmax and additionalSpectrumEmission values, bandwidth, BWP configuration, etc.) related to the SUL.

At some point in time, the UE initiates a Random Access Procedure on the camped cell (210). Typically, in the RRC IDLE state the random access procedure is initiated for connection establishment or for acquiring the on demand system information. In the RRC INACTIVE state, the random access procedure is initiated for connection resumption or for acquiring the on demand system information.

The UE may determine the RSRP of a downlink signal. Upon initiation of random access, the UE checks the RSRP of the downlink pathloss reference against the configured threshold (i.e., rsrp-ThresholdSSB-SUL) (220). The RSRP of the downlink pathloss reference is one of the following:
    SS-RSRP of the SSB with highest SS-RSRP value or
    SS-RSRP of any suitable SSB or
    Serving cell quality, where
        If absThreshSS-BlocksConsolidation and nrofSS-BlocksToAverage is configured, serving cell quality is the linear power scale average of the SS-RSRP of SSB(s) above absThreshSS-BlocksConsolidation, where the total number of averaged SSBs shall not exceed nrofSS-BlocksToAverage If absThreshSS-BlocksConsolidation and nrofSS-BlocksToAverage is not configured, serving cell quality is the SS-RSRP of SSB with highest SS-RSRP If the RSRP of the downlink pathloss reference is greater than or equal to a configured threshold (i.e., rsrp-ThresholdSSB-SUL), the UE selects the UL carrier (230). The threshold (i.e., rsrp-ThresholdSSB-SUL) is signaled by the gNB. It is signaled as part of the RACH configuration of the SUL.

If the RSRP of the downlink pathloss reference is less than the configured threshold (e.g., rsrp-ThresholdSSB-SUL) and if the UE supports one or more frequency bands indicated in the frequencyBandList of SUL (240) and if the UE supports the bandwidth of the initial uplink BWP indicated in locationAndBandwidth field of the SUL (250) and if the UE supports at least one additionalSpectrumEmission in the NR-NS-PmaxList for a supported SUL band (260), then the UE selects the SUL carrier (270). The parameters frequencyBandList, NR-NS-PmaxList, BWP configuration of the SUL are received by the UE in SIB1. The threshold (i.e., rsrp-ThresholdSSB-SUL) is signaled by the gNB. It is signaled as part of the RACH configuration of the SUL.

Alternate: if the RSRP of the downlink pathloss reference is less than the configured threshold (e.g., rsrp-ThresholdSSB-SUL) and if the UE supports one or more frequency bands indicated in the frequencyBandList of SUL (240) and if the UE supports the bandwidth of the initial uplink BWP and dedicated UL BWPs (if configured by the gNB) indicated in locationAndBandwidth field of the SUL (250) and if the UE supports at least one additionalSpectrumEmission in the NR-NS-PmaxList for a supported SUL band (260), then the UE selects the SUL carrier (270). The parameters frequencyBandList, NR-NS-PmaxList, BWP configuration of SUL are received by UE in SIB1. The threshold (i.e., rsrp-ThresholdSSB-SUL) is signaled by the gNB. It is signaled as part of the RACH configuration of the SUL.

If the RSRP of the downlink pathloss reference is less than the configured threshold (e.g., rsrp-ThresholdSSB-SUL) and if the UE does not support one or more frequency bands indicated in the frequencyBandList of the SUL (240) or if the UE does not support the bandwidth of the initial uplink BWP indicated in locationAndBandwidth field of the SUL (250) or if the UE does not support at least one additionalSpectrumEmission in the NR-NS-PmaxList for a supported supplementary uplink band (260), then the UE triggers cell reselection to a carrier different than the carrier of this camped cell. The UE also bars this camped cell for a pre-defined (or configurable) time (280). The parameters frequencyBandList, NR-NS-PmaxList, BWP configuration of SUL are received by UE in SIB1. The threshold (i.e., rsrp-ThresholdSSB-SUL) is signaled by the gNB. It is signaled as part of the RACH configuration of the SUL.

Alternate: if the RSRP of the downlink pathloss reference is less than the configured threshold (e.g., rsrp-ThresholdSSB-SUL) and if the UE does not support one or more frequency bands indicated in the frequencyBandList of the SUL (240) or if the UE does not supports the bandwidth of the initial uplink BWP and dedicated UL BWPs (if configured by the gNB) indicated in locationAndBandwidth field of the SUL (250) or if the UE does not support at least one additionalSpectrumEmission in the NR-NS-PmaxList for a supported supplementary uplink band (260), then the UE triggers cell reselection to a carrier different than the carrier of this camped cell. The UE also bars this camped cell for a pre-defined (or configurable) time (280). The parameters frequencyBandList, NR-NS-PmaxList, BWP configuration of SUL are received by the UE in SIB 1. The threshold (i.e., rsrp-ThresholdSSB-SUL) is signaled by gNB. It is signaled as part of the RACH configuration of the SUL.

Embodiment 2

Figure 3:
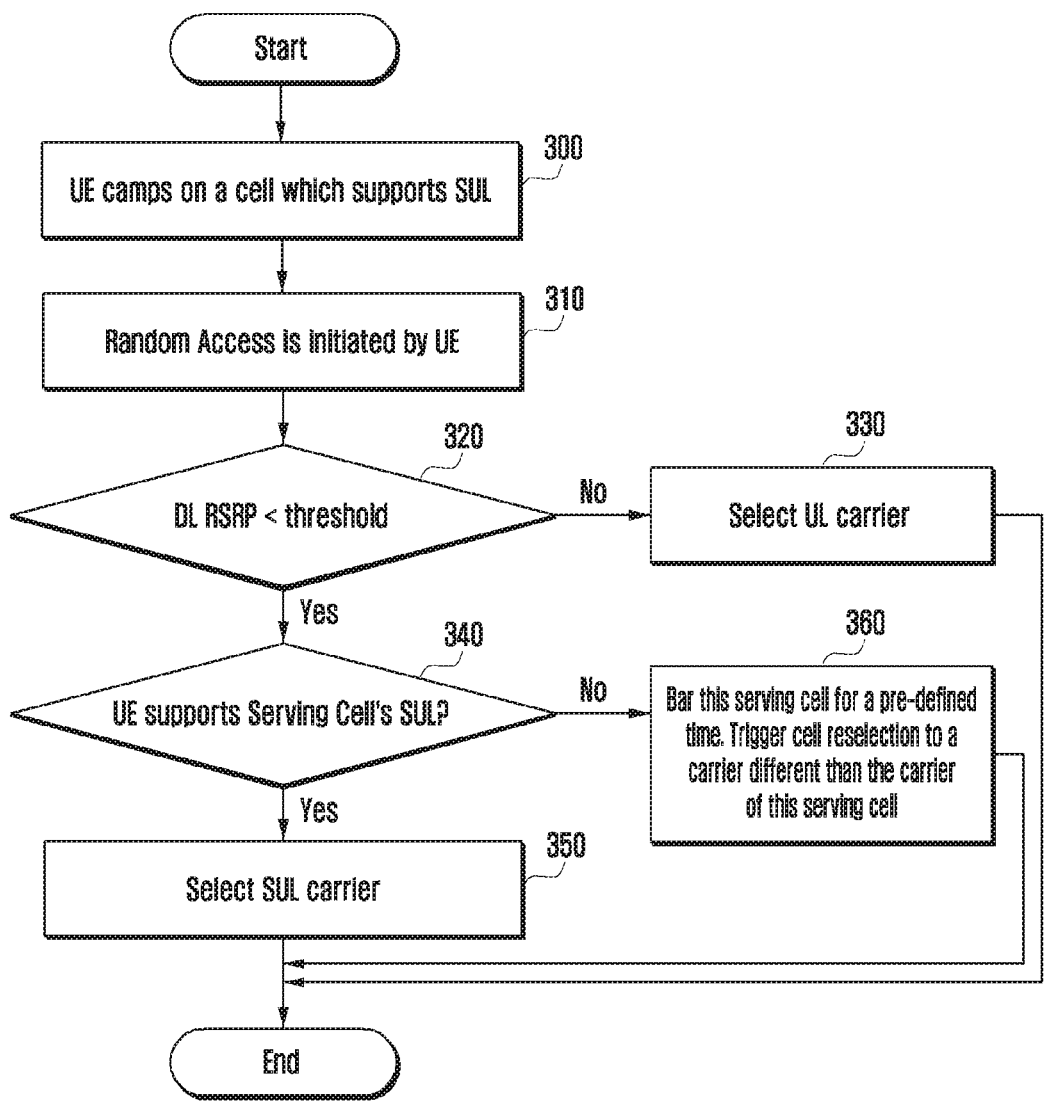
FIG. 3 illustrates an operational flowchart explaining a process of terminal proposed in embodiment 2.

In one embodiment of this disclosure the UE operation is illustrated in FIG. 3.

The UE camps on a suitable cell (300). The cell on which the UE camps supports a downlink (DL) carrier, an uplink (UL) carrier and a supplementary uplink (SUL) carrier. Note that presence of the SUL carrier in the cell is indicated by presence of supplementaryUplink IE in SIB1. The supplementaryUplink IE provides information (such as associated frequency band(s), additionalPmax and additionalSpectrumEmission values, bandwidth, BWP configuration, etc.) related to the SUL.

At some point in time, the UE initiates a Random Access Procedure on the camped cell (310). Typically, in the RRC IDLE state the random access procedure is initiated for connection establishment or for acquiring the on demand system information. In the RRC INACTIVE state, the random access procedure is initiated for connection resumption or for acquiring the on demand system information.

Upon initiation of random access, the UE checks the RSRP of the downlink pathloss reference against the configured threshold (i.e., rsrp-ThresholdSSB-SUL) (320). The RSRP of the downlink pathloss reference is one of the following:

SS-RSRP of the SSB with highest SS-RSRP value or
SS-RSRP of any suitable SSB or
Serving cell quality, where
If absThreshSS-BlocksConsolidation and nrofSS-BlocksToAverage is configured, serving cell quality is the linear power scale average of the SS-RSRP of SSB(s) above absThreshSS-BlocksConsolidation, where the total number of averaged SSBs shall not exceed nrofSS-BlocksToAverage
If absThreshSS-BlocksConsolidation and nrofSS-BlocksToAverage is not configured, serving cell quality is the SS-RSRP of SSB with highest SS-RSRP If the RSRP of the downlink pathloss reference is greater than or equal to a configured threshold (i.e., rsrp-ThresholdSSB-SUL), the UE selects the UL carrier (330). The threshold (i.e., rsrp-ThresholdSSB-SUL) is signaled by the gNB. It is signaled as part of the RACH configuration of the SUL.

If the RSRP of the downlink pathloss reference is less than the configured threshold (e.g., rsrp-ThresholdSSB-SUL) and if the UE supports serving cell's SUL (340) then the UE selects the SUL carrier (350). The parameters frequencyBandList, NR-NS-PmaxList, BWP configuration of SUL are received by UE in SIB1. The threshold (i.e., rsrp-ThresholdSSB-SUL) is signaled by the gNB. It is signaled as part of the RACH configuration of the SUL. The serving cell's SUL is supported by the UE, if it supports the SUL feature and if it supports one or more frequency bands indicated in the frequencyBandList of the SUL and if the UE supports the bandwidth of the uplink BWP indicated in locationAndBandwidth field of the SUL and if the UE supports at least one additionalSpectrumEmission in the NR-NS-PmaxList for a supported supplementary uplink band.

(Alternate): The serving cell's SUL is supported by the UE (340), if it supports the SUL feature and if it supports one or more frequency bands indicated in the frequencyBandList of the SUL (240) and if the UE supports the bandwidth of the initial uplink BWP and dedicated UL BWP(s) indicated in locationAndBandwidth field of the SUL (250) and if the UE supports at least one additionalSpectrumEmission in the NR-NS-PmaxList for a supported supplementary uplink band (260).

If the RSRP of the downlink pathloss reference is less than the configured threshold (e.g., rsrp-ThresholdSSB-SUL) and if the UE does not support the SUL (340), then the UE triggers cell reselection to a carrier different than the carrier of this camped cell. In an embodiment the UE triggers cell reselection. The UE also bars this camped cell for a pre-defined (or configurable) time (360). The parameters frequencyBandList, NR-NS-PmaxList, BWP configuration of SUL are received by UE in SIB1. The threshold (i.e., rsrp-ThresholdSSB-SUL) is signaled by the gNB. It is signaled as part of the RACH configuration of the SUL. Serving cell's SUL is not supported by UE, if it does not support SUL feature or if it does not support one or more frequency bands indicated in the frequencyBandList of SUL or if the UE does not support the bandwidth of the initial uplink BWP indicated in locationAndBandwidth field of SUL and if the UE does not support at least one additionalSpectrumEmission in the NR-NS-PmaxList for a supported supplementary uplink band.

Alternate: The serving cell's SUL is not supported by the UE (340), if it does not support the SUL feature or if it does not support one or more frequency bands indicated in the frequencyBandList of SUL (240) or if the UE does not support the bandwidth of the initial uplink BWP or dedicated BWP(s) indicated in locationAndBandwidth field of SUL (250) and if the UE does not support at least one additionalSpectrumEmission in the NR-NS-PmaxList for a supported supplementary uplink band (260).

Embodiment 3

Figure 4:
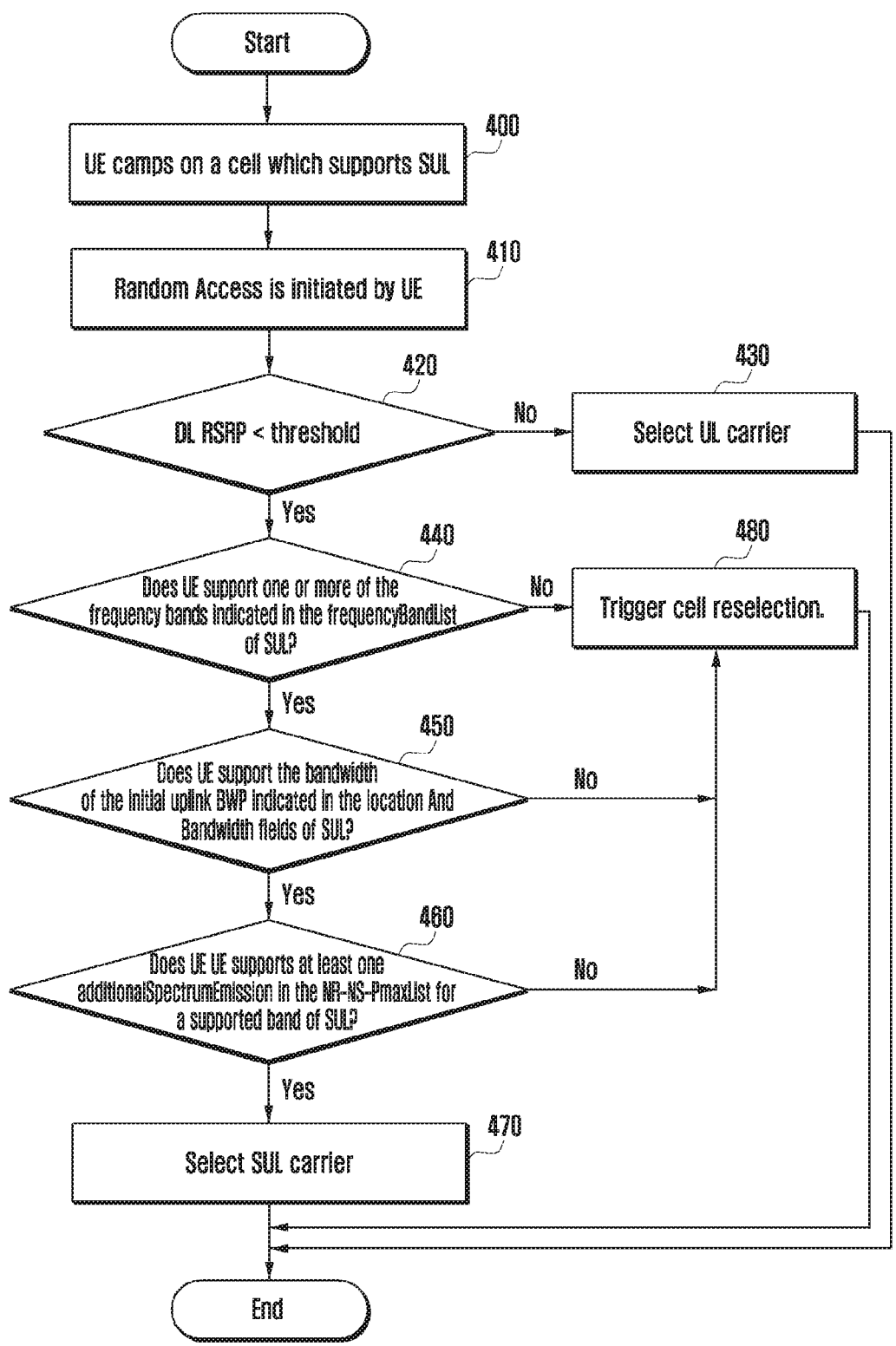
FIG. 4 illustrates an operational flowchart explaining a process of terminal proposed in embodiment 3.

In one embodiment of this disclosure the UE operation is illustrated in FIG. 4.

The UE camps on a suitable cell (400). The cell on which the UE camps supports a downlink (DL) carrier, an uplink (UL) carrier and a supplementary uplink (SUL) carrier. Note that presence of the SUL carrier in the cell is indicated by the presence of supplementaryUplink IE in SIB1. The supplementaryUplink IE provides information (such as associated frequency band(s), additionalPmax and additionalSpectrumEmission values, bandwidth, BWP configuration, etc.) related to the SUL.

At some point in time, the UE initiates a Random Access Procedure on the camped cell (410). Typically, in the RRC IDLE state the random access procedure is initiated for connection establishment or for acquiring the on demand system information. In the RRC INACTIVE state, the random access procedure is initiated for connection resumption or for acquiring the on demand system information.

Upon initiation of random access, the UE checks the RSRP of the downlink pathloss reference against the configured threshold (i.e., rsrp-ThresholdSSB-SUL) (420). The RSRP of the downlink pathloss reference is one of the following:

SS-RSRP of the SSB with highest SS-RSRP value or
SS-RSRP of any suitable SSB or
Serving cell quality, where
    If absThreshSS-BlocksConsolidation and nrofSS-BlocksToAverage is configured, serving cell quality is the linear power scale average of the SS-RSRP of SSB(s) above absThreshSS-BlocksConsolidation, where the total number of averaged SSBs shall not exceed nrofSS-BlocksToAverage
    If absThreshSS-BlocksConsolidation and nrofSS-BlocksToAverage is not configured, serving cell quality is the SS-RSRP of SSB with highest SS-RSRP If the RSRP of the downlink pathloss reference is greater than or equal to a configured threshold (i.e., rsrp-ThresholdSSB-SUL), the UE selects the UL carrier (430). The threshold (i.e., rsrp-ThresholdSSB-SUL) is signaled by the gNB. It is signaled as part of the RACH configuration of the SUL.

If the RSRP of the downlink pathloss reference is less than the configured threshold (e.g., rsrp-ThresholdSSB-SUL) and if the UE supports one or more frequency bands indicated in the frequencyBandList of SUL (440) and if the UE supports the bandwidth of the initial uplink BWP indicated in locationAndBandwidth field of the SUL (450) and if the UE supports at least one additionalSpectrumEmission in the NR-NS-PmaxList for a supported supplementary uplink band (460), then the UE selects the SUL carrier (470). The parameters frequencyBandList, NR-NS-PmaxList, BWP configuration of SUL are received by the UE in SIB1. The threshold (i.e., rsrp-ThresholdSSB-SUL) is signaled by the gNB. It is signaled as part of the RACH configuration of the SUL.

If the RSRP of the downlink pathloss reference is less than the configured threshold (e.g., rsrp-ThresholdSSB-SUL) and if the UE does not support one or more frequency bands indicated in the frequencyBandList of the SUL (440) or if the UE does not support the bandwidth of the initial uplink BWP indicated in locationAndBandwidth field of the SUL (450) or if the UE does not support at least one additionalSpectrumEmission in the NR-NS-PmaxList for a supported supplementary uplink band (460), then the UE triggers cell reselection (480). In an embodiment, the UE also bars this camped cell for a pre-defined (or configurable) time. The parameters frequencyBandList, NR-NS-PmaxList, BWP configuration of SUL are received by UE in SIB1. The threshold (i.e. rsrp-ThresholdSSB-SUL) is signaled by gNB. It is signaled as part of the RACH configuration of the SUL.

Alternate: if the RSRP of the downlink pathloss reference is less than the configured threshold (e.g., rsrp-ThresholdSSB-SUL) and if the UE does not support one or more frequency bands indicated in the frequencyBandList of SUL (440) or if the UE does not supports the bandwidth of the initial uplink BWP or dedicated BWP(s) indicated in locationAndBandwidth field of the SUL (450) or if the UE does not support at least one additionalSpectrumEmission in the NR-NS-PmaxList for a supported supplementary uplink band (460), then the UE triggers cell reselection (480). In an embodiment, the UE also bars this camped cell for a pre-defined (or configurable) time. The parameters frequencyBandList, NR-NS-PmaxList, BWP configuration of SUL are received by UE in SIB1. The threshold (i.e., rsrp-ThresholdSSB-SUL) is signaled by the gNB. It is signaled as part of the RACH configuration of the SUL.

Embodiment 4

The UE initiates a Random Access Procedure on the camped cell. Typically, in the RRC IDLE state a random access procedure is initiated for connection establishment or for acquiring the on demand system information. In the RRC INACTIVE state, the random access procedure is initiated for connection resumption or for acquiring the on demand system information.

When the Random Access procedure is initiated the UE performs the following operation:

1> if the carrier to use for the Random Access procedure is explicitly signalled:
  2> select the signalled carrier for performing Random Access procedure;
  2> set the PCMAX to PCMAX,f,c of the signalled carrier.
1> else if the carrier to use for the Random Access procedure is not explicitly signalled; and
  1> if the Serving Cell for the Random Access procedure is configured with SUL; and
  1> if the RSRP of the downlink pathloss reference is less than rsrp-ThresholdSSB-SUL:
    2> select the SUL carrier for performing Random Access procedure;
    2> set the PCMAX to PCMAX,f,c of the SUL carrier.
  1> else:
    2> if rsrp-ThresholdSSB-SUL is configured; and
    2> if the RSRP of the downlink pathloss reference is less than rsrp-ThresholdSSB-SUL:
      3> consider the cell as barred and perform cell re-selection as specified in TS 38.304;
    2> else:
      3> select the NUL carrier for performing Random Access procedure;
      3> set the PCMAX to PCMAX,f,c of the NUL carrier.

In the above procedure, RSRP of the downlink pathloss reference is one of the following:

SS-RSRP of the SSB with highest SS-RSRP value or
SS-RSRP of any suitable SSB or
Serving cell quality, where
  If absThreshSS-BlocksConsolidation and nrofSS-BlocksToAverage is configured, serving cell quality is the linear power scale average of the SS-RSRP of SSB(s) above absThreshSS-BlocksConsolidation, where the total number of averaged SSBs shall not exceed nrofSS-BlocksToAverage
  If absThreshSS-BlocksConsolidation and nrofSS-BlocksToAverage is not configured, serving cell quality is the SS-RSRP of SSB with highest SS-RSRP The threshold (i.e., rsrp-ThresholdSSB-SUL) is also received by the UE from the gNB in SI or dedicated signaling. It is signaled as part of the RACH configuration of the SUL.

In the above procedure, the serving Cell for the Random Access procedure is configured with the SUL if parameter/field supplementaryUplink is signaled by the gNB (in the SI or reconfiguration message) and if the UE supports one or more frequency bands indicated in the frequencyBandList of the SUL and if the UE supports the bandwidth of the initial uplink BWP indicated in locationAndBandwidth field of the SUL and if the UE supports at least one additionalSpectrumEmission in the NR-NS-PmaxList for a supported supplementary uplink band.

Alternate: In the above procedure, the serving Cell for the Random Access procedure is configured with the SUL if parameter/field supplementaryUplink is signaled by the gNB (in the SI or reconfiguration message) and if the UE supports one or more frequency bands indicated in the frequencyBandList of the SUL and if the UE supports the bandwidth of the initial uplink BWP and other dedicated uplink BWPs (if configured) indicated in locationAndBandwidth field of the SUL and if the UE supports at least one additionalSpectrumEmission in the NR-NS-PmaxList for a supported supplementary uplink band.

Embodiment 5

The UE initiates a Random Access Procedure on the camped cell. Typically, in the RRC IDLE state a random access procedure is initiated for connection establishment or for acquiring the on demand system information. In the RRC INACTIVE state, the random access procedure is initiated for connection resumption or for acquiring the on demand system information.

When the Random Access procedure is initiated the UE performs the following operation:

1> if the carrier to use for the Random Access procedure is explicitly signalled:
  2> select the signalled carrier for performing Random Access procedure;
  2> set the PCMAX to PCMAX,f,c of the signalled carrier.
  2> else if the carrier to use for the Random Access procedure is not explicitly signalled; and
1> if the Serving Cell for the Random Access procedure is configured with SUL; and
1> if the RSRP of the downlink pathloss reference is less than rsrp-ThresholdSSB-SUL:
  2> select the SUL carrier for performing Random Access procedure;
  2> set the PCMAX to PCMAX,f,c of the SUL carrier.
1> else:
  2> if rsrp-ThresholdSSB-NUL is configured; and
  2> if the RSRP of the downlink pathloss reference is less than rsrp-ThresholdSSB-NUL:
    3> consider the cell as barred and perform cell re-selection as specified in TS 38.304;
  2> else:
    3> select the NUL carrier for performing Random Access procedure;
    3> set the PCMAX to PCMAX,f,c of the NUL carrier.

In the above procedure, the RSRP of the downlink pathloss reference is one of the following:

SS-RSRP of the SSB with highest SS-RSRP value or
SS-RSRP of any suitable SSB or
Serving cell quality, where
  If absThreshSS-BlocksConsolidation and nrofSS-BlocksToAverage is configured, serving cell quality is the linear power scale average of the SS-RSRP of SSB(s) above absThreshSS-BlocksConsolidation, where the total number of averaged SSBs shall not exceed nrofSS-BlocksToAverage
  If absThreshSS-BlocksConsolidation and nrofSS-BlocksToAverage is not configured, serving cell quality is the SS-RSRP of SSB with highest SS-RSRP The threshold (i.e., rsrp-ThresholdSSB-NUL) is also received by the UE from the gNB in the SI or dedicated signaling. It is signaled as part of the RACH configuration.

In the above procedure, the serving Cell for the Random Access procedure is configured with the SUL if parameter/field supplementaryUplink is signaled by the gNB (in the SI or reconfiguration message) and if the UE supports one or more frequency bands indicated in the frequencyBandList of SUL and if the UE supports the bandwidth of the initial uplink BWP indicated in locationAndBandwidth field of the SUL and if the UE supports at least one additionalSpectrumEmission in the NR-NS-PmaxList for a supported supplementary uplink band.

Alternate: In the above procedure, the serving Cell for the Random Access procedure is configured with the SUL if parameter/field supplementaryUplink is signaled by the gNB (in the SI or reconfiguration message) and if the UE supports one or more frequency bands indicated in the frequencyBandList of the SUL and if the UE supports the bandwidth of the initial uplink BWP and other dedicated uplink BWPs (if configured) indicated in locationAndBandwidth field of the SUL and if the UE supports at least one additionalSpectrumEmission in the NR-NS-PmaxList for a supported supplementary uplink band.

Embodiment 6

Upon reception of SIB1, if the uplink is not present in servingCellConfigCommon and if the supplementaryUplink is present in servingCellConfigCommon, the UE performs the following:

if the UE supports one or more of the frequency bands indicated in the frequencyBandList for downlink; and if the UE supports one or more of the frequency bands indicated in the frequencyBandList of supplementary uplink; and if the UE supports at least one additionalSpectrumEmission in the NR-NS-PmaxList for a supported supplementary uplink band; and if the UE supports the bandwidth of the initial uplink BWP indicated in the locationAndBandwidth fields of supplementary uplink:

```
{
    forward the cellIdentity to upper layers;
    forward the trackingAreaCode to upper layers;
    if in RRC_INACTIVE and the forwarded trackingAreaCode does not trigger
        message transmission by upper layers:
        -   if the serving cell does not belong to the configured ran-
            NotificationAreaInfo: initiate an RNA update as specified in 5.3.13.8;
    forward the ims-EmergencySupport to upper layers, if present;
    forward the eCallOverIMS-Support to upper layers, if present;
    apply the configuration included in the servingCellConfigCommon;
    apply the specified PCCH configuration defined in 9.1.1.3;
    if the UE has a stored valid version of a SIB, that the UE requires to operate within
        the cell: use the stored version of the required SIB;
    if the UE has not stored a valid version of a SIB, of one or several required SIB(s):
        -   for the SI message(s) that, according to the si-SchedulingInfo, contain at
            least one required SIB and for which si-BroadcastStatus is set to
            broadcasting: acquire the SI message(s);
        -   for the SI message(s) that, according to the si-SchedulingInfo, contain at
            least one required SIB and for which si-BroadcastStatus is set to
            notBroadcasting: trigger a request to acquire the SI message(s);
    apply the first listed additionalSpectrumEmission which it supports among the
        values included in NR-NS-PmaxList within frequencyBandList for the
        supplementaryUplink;
    if the additionalPmax is present in the same entry of the selected
        additionalSpectrumEmission within NR-NS-PmaxList for the
        supplementaryUplink:
            -   apply the additionalPmax in supplementaryUplink for SUL;
        else:
            -   apply the p-Max in supplementaryUplink for SUL;
}
else:
{
    consider the cell as barred in accordance with TS 38.304
}
```

Figure 5:
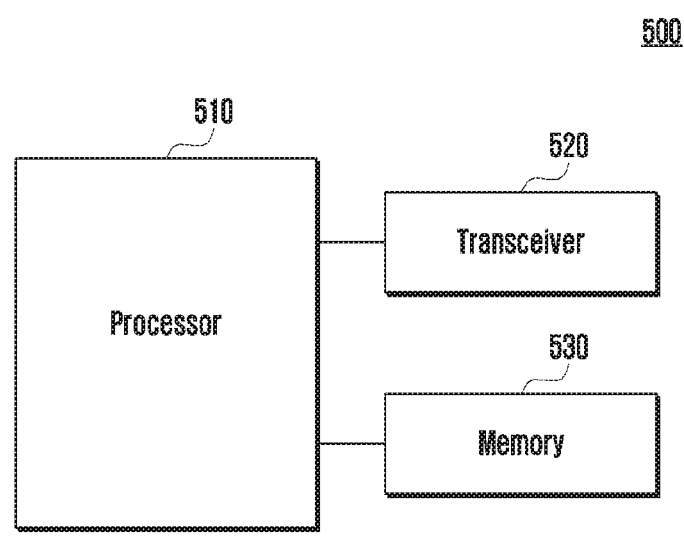
FIG. 5 illustrates a block diagram of a configuration of a base station according to embodiments of the disclosure.

FIG. 5 illustrates a block diagram of a base station (BS) according to embodiments of the present disclosure.

Referring to the FIG. 5, the BS (500) may include a processor (510), a transceiver (520) and a memory (530). However, all of the illustrated components are not essential. The BS (500) may be implemented by more or less components than those illustrated in FIG. 5. In addition, the processor (510) and the transceiver (520) and the memory (530) may be implemented as a single chip according to another embodiment.

The aforementioned components will now be described in detail.

The processor (510) may include one or more processors or other processing devices that control the proposed function, process, and/or method. Operation of the BS (500) may be implemented by the processor (510). In one embodiment, the processor (510) may transmit a signal including the RSRP threshold (i.e., rsrp-ThresholdSSB-SUL). The transceiver (520) may include an RF transmitter for up-converting and amplifying a transmitted signal, and an RF receiver for down-converting a frequency of a received signal. However, according to another embodiment, the transceiver (520) may be implemented by more or less components than those illustrated in components. The transceiver (500) may be connected to the processor (510) and transmit and/or receive a signal. The signal may include control information and data. In addition, the transceiver (520) may receive the signal through a wireless channel and output the signal to the processor (510). The transceiver (520) may transmit a signal output from the processor (510) through the wireless channel. The memory (530) may store the control information or the data included in a signal obtained by the BS (500). The memory (530) may be connected to the processor (510) and store at least one instruction or a protocol or a parameter for the proposed function, process, and/or method. The memory (530) may include read-only memory (ROM) and/or random access memory (RAM) and/or hard disk and/or CD-ROM and/or DVD and/or other storage devices.

Figure 6:
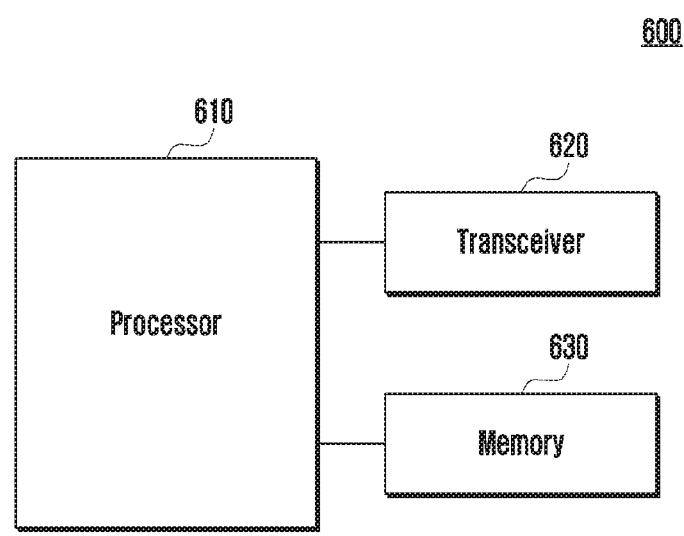
FIG. 6 illustrates a block diagram of a configuration of a terminal according to embodiments of the disclosure.

FIG. 6 illustrates a user equipment (UE) according to embodiments of the present disclosure.

Referring to the FIG. 6, the UE (600) may include a processor (610), a transceiver (620) and a memory (630). However, all of the illustrated components are not essential. The UE (600) may be implemented by more or less components than those illustrated in FIG. 6. In addition, the processor (610) and the transceiver (620) and the memory (630) may be implemented as a single chip according to another embodiment.

The aforementioned components will now be described in detail.

The processor (610) may include one or more processors or other processing devices that control the proposed function, process, and/or method. Operation of the UE (600) may be implemented by the processor (610). In one embodiment, the processor (610) may determine the RSRP of a signal and identify whether the determined RSRP is less than a predetermined threshold. The transceiver (620) may include an RF transmitter for up-converting and amplifying a transmitted signal, and an RF receiver for down-converting a frequency of a received signal. However, according to another embodiment, the transceiver (620) may be implemented by more or less components than those illustrated in components. The transceiver (620) may be connected to the processor (610) and transmit and/or receive a signal. The signal may include control information and data. In addition, the transceiver (620) may receive the signal through a wireless channel and output the signal to the processor (610). The transceiver (620) may transmit a signal output from the processor (610) through the wireless channel. The memory (630) may store the control information or the data included in a signal obtained by the UE (600). The memory (630) may be connected to the processor (610) and store at least one instruction or a protocol or a parameter for the proposed function, process, and/or method. The memory (630) may include read-only memory (ROM) and/or random access memory (RAM) and/or hard disk and/or CD-ROM and/or DVD and/or other storage devices.

Certain examples of the present disclosure may be provided in the form of a base station (e.g., gNB) and/or method therefore. Certain examples of the present disclosure may be provided in the form of a mobile device (e.g., UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a terminal in a mobile communication system, the method comprising:
   determining a reference signal received power (RSRP) of a signal received from a first cell;
   identifying whether the determined RSRP is less than a threshold value;
   identifying whether a supplementary uplink (SUL) carrier for the first cell is available to the terminal, in case that the determined RSRP is less than the threshold value; and
   determining whether to trigger a cell reselection barring the first cell or to perform a random access to the first cell using the SUL carrier, based on a result of the identification of whether the SUL carrier for the first cell is available to the terminal.

2. The method of claim 1, wherein the cell reselection barring the first cell is triggered, in case that the SUL carrier for the first cell is not available to the terminal.

3. The method of claim 2, further comprising:
   performing the cell reselection to a second cell different than the first cell for a predetermined time, in case that the cell reselection barring the first cell is triggered.

4. The method of claim 1, wherein the identifying whether the SUL carrier for the first cell is available to the terminal further comprises:
   identifying whether the terminal supports the SUL carrier for the first cell based on capability information of the terminal.

5. The method of claim 4, wherein the cell reselection barring the first cell is triggered, in case that the terminal does not support the SUL carrier for the first cell.

6. The method of claim 1, wherein the identifying whether the SUL carrier for the first cell is available to the terminal further comprises:
   identifying whether the terminal supports at least one frequency band associated with the SUL;
   identifying whether the terminal supports a bandwidth of an uplink bandwidth part (BWP) associated with the SUL; and
   identifying whether the terminal supports at least one additional Spectrum Emission associated with the SUL.

7. The method of claim 1, further comprising:
   selecting the SUL carrier for a random access procedure, in case that the SUL carrier for the first cell is available to the terminal; and
   performing the random access procedure to the first cell based on the selected SUL carrier.

8. The method of claim 1, wherein the determined RSRP is the RSRP of a downlink pathloss reference in a random access procedure.

9. The method of claim 1, wherein the threshold value is received from a base station associated with the first cell.

10. The method of claim 1, wherein the signal is received upon initiation of a random access procedure.

11. A terminal in a mobile communication system, the terminal comprising:
    a transceiver; and
    a processor coupled with the transceiver, the processor configured to:
    determine a reference signal received power (RSRP) of a signal received from a first cell,
    identify whether the determined RSRP is less than a threshold value,
    identify whether a supplementary uplink (SUL) carrier for the first cell is available to the terminal, in case that the determined RSRP is less than the threshold value, and
    determine whether to trigger a cell reselection barring the first cell or to perform a random access to the first cell using the SUL carrier, based on a result of the identification of whether the SUL carrier for the first cell is available to the terminal.

12. The terminal of claim 11, wherein the cell reselection barring the first cell is triggered, in case that the SUL carrier for the first cell is not available to the terminal.

13. The terminal of claim 12, wherein the processor is further configured to:
    perform the cell reselection to a second cell different than the first cell for a predetermined time, in case that the cell reselection barring the first cell is triggered.

14. The terminal of claim 11, wherein the processor is further configured to identify whether the SUL carrier for the first cell based on capability information of the terminal.

15. The terminal of claim 14, wherein the cell reselection barring the first cell is triggered, in case that the terminal does not support the SUL carrier for the first cell.

16. The terminal of claim 11, wherein the processor is further configured to:
    identify whether the terminal supports at least one frequency band associated with the SUL,
    identify whether the terminal supports a bandwidth of an uplink bandwidth part (BWP) associated with the SUL, and
    identify whether the terminal supports at least one additional Spectrum Emission associated with the SUL.

17. The terminal of claim 11, wherein the processor is further configured to:
    select the SUL carrier for a random access procedure, in case that the SUL carrier for the first cell is available to the terminal, and
    perform the random access procedure to the first cell based on the selected SUL carrier.

18. The terminal of claim 11, wherein the determined RSRP is the RSRP of a downlink pathloss reference in a random access procedure.

19. The terminal of claim 11, wherein the threshold value is received from a base station associated with the first cell.

20. The terminal of claim 11, wherein the signal is received upon initiation of random access procedure.

* * * * *